US011768339B2

(12) United States Patent
Hiraka et al.

(10) Patent No.: US 11,768,339 B2
(45) Date of Patent: Sep. 26, 2023

(54) OPTICAL RECEPTACLE AND OPTICAL MODULE

(71) Applicant: Enplas Corporation, Saitama (JP)

(72) Inventors: Kensuke Hiraka, Saitama (JP); Honoka Nara, Saitama (JP); Ayano Hinata, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/748,155

(22) Filed: May 19, 2022

(65) Prior Publication Data

US 2022/0373749 A1 Nov. 24, 2022

(30) Foreign Application Priority Data

May 21, 2021 (JP) ................................. 2021-086315

(51) Int. Cl.
*H04B 10/00* (2013.01)
*G02B 6/42* (2006.01)

(52) U.S. Cl.
CPC ......... *G02B 6/4243* (2013.01); *G02B 6/4262* (2013.01)

(58) Field of Classification Search
CPC .. G02B 6/4243; G02B 6/4262; G02B 6/4244; G02B 6/4266; G02B 6/4204
See application file for complete search history.

(56) References Cited

U.S. PATENT DOCUMENTS

| | | | | | |
|---|---|---|---|---|---|
| 5,173,810 | A | * | 12/1992 | Yamakawa | G02B 3/00 257/E33.072 |
| 5,333,224 | A | * | 7/1994 | Kikuchi | G02B 6/4204 385/93 |
| 5,684,903 | A | * | 11/1997 | Kyomasu | G02B 6/4292 385/94 |
| 5,953,355 | A | * | 9/1999 | Kiely | H01S 5/02257 438/26 |
| 5,973,862 | A | * | 10/1999 | Hashizume | G02B 6/4245 385/35 |
| 6,062,742 | A | * | 5/2000 | Yuuki | G02B 6/4206 385/88 |
| 6,283,644 | B1 | * | 9/2001 | Gilliland | G02B 6/4244 385/88 |
| 6,432,733 | B1 | * | 8/2002 | Hashizume | G02B 6/4245 438/22 |
| 6,459,835 | B1 | * | 10/2002 | Nagaoka | G02B 6/4206 385/98 |
| 6,659,659 | B1 | * | 12/2003 | Malone | G02B 6/4237 385/94 |

(Continued)

FOREIGN PATENT DOCUMENTS

JP   2006-163372 A   6/2006

*Primary Examiner* — Agustin Bello
(74) *Attorney, Agent, or Firm* — Shih IP Law Group, PLLC (57) ABSTRACT

An optical receptacle includes an optical receptacle main body and a cylindrical fixing member. The optical receptacle main body includes a first optical surface, a second optical surface, and an annular groove disposed to surround a first central axis of the first optical surface or disposed to surround a second central axis of the second optical surface. The fixing member is configured with a material with a smaller linear expansion coefficient than that of the optical receptacle main body, and is fit to the groove so as to be in contact with at least a part of an inner surface of the groove.

6 Claims, 9 Drawing Sheets

(56) References Cited

U.S. PATENT DOCUMENTS

| | | | | |
|---|---|---|---|---|
| 6,931,181 B2* | 8/2005 | Jewell | G02B 6/423 | 385/33 |
| 7,002,697 B2* | 2/2006 | Domash | G02B 6/4246 | 356/519 |
| 7,153,036 B2* | 12/2006 | Healy | G02B 6/4292 | 385/76 |
| 7,217,042 B2* | 5/2007 | Okada | G02B 6/4292 | 385/94 |
| 7,313,302 B2* | 12/2007 | Fincato | G02B 6/4201 | 385/88 |
| 7,322,752 B2* | 1/2008 | Endou | G02B 6/4206 | 385/94 |
| 7,348,203 B2* | 3/2008 | Kaushal | G01J 5/045 | 257/434 |
| 7,364,370 B2* | 4/2008 | Nishizawa | G02B 6/421 | 385/88 |
| 7,441,963 B2* | 10/2008 | Dunn | G02B 6/4292 | 385/88 |
| 7,457,343 B2* | 11/2008 | Vancoille | G02B 6/4214 | 372/103 |
| 7,476,040 B2* | 1/2009 | Zack | G02B 6/4279 | 385/93 |
| 7,540,669 B2* | 6/2009 | Sato | G02B 6/4246 | 385/92 |
| 7,572,069 B2* | 8/2009 | Teo | G02B 6/4207 | 385/94 |
| 7,796,850 B2* | 9/2010 | Jewell | G02B 6/4207 | 385/33 |
| 7,802,930 B2* | 9/2010 | Jewell | G02B 6/423 | 385/33 |
| 8,083,419 B2* | 12/2011 | Sato | G02B 6/421 | 385/88 |
| 8,511,909 B2* | 8/2013 | Kadar-Kallen | G02B 6/4207 | 385/74 |
| 8,542,425 B2* | 9/2013 | Cho | G02F 1/133608 | 359/245 |
| 9,116,318 B2* | 8/2015 | Fujimura | G02B 6/4237 | |
| 9,612,414 B2* | 4/2017 | Amirkiai | G02B 6/43 | |
| 9,772,467 B2* | 9/2017 | Amirkiai | B23K 11/08 | |
| 9,791,646 B2* | 10/2017 | Okada | G02B 6/4277 | |
| 9,995,891 B2* | 6/2018 | Han | G02B 6/4292 | |
| 10,050,410 B2* | 8/2018 | Xu | H01S 5/02469 | |
| 10,317,633 B2* | 6/2019 | Yu | H05K 7/1427 | |
| 10,412,293 B2* | 9/2019 | Arekar | H04N 23/55 | |
| 10,928,599 B2* | 2/2021 | Schwerzig | G02B 6/4253 | |
| 11,022,767 B2* | 6/2021 | Zhao | G02B 6/4263 | |
| 2001/0051027 A1* | 12/2001 | Matsushita | G02B 6/4206 | 385/79 |
| 2002/0145139 A1* | 10/2002 | Wagner | H01L 31/03682 | 257/53 |
| 2002/0185588 A1* | 12/2002 | Wagner | H01S 5/02251 | 257/E31.095 |
| 2003/0020998 A1* | 1/2003 | Kuczynski | G02B 6/4253 | 359/245 |
| 2003/0160314 A1* | 8/2003 | Crane, Jr. | G02B 6/4244 | 257/434 |
| 2003/0201462 A1* | 10/2003 | Pommer | G02B 6/4259 | 257/200 |
| 2004/0091218 A1* | 5/2004 | van Haasteren | G02B 6/4206 | 385/33 |
| 2004/0146251 A1* | 7/2004 | Kudo | G02B 6/4206 | 385/88 |
| 2004/0146252 A1* | 7/2004 | Healy | G02B 6/4206 | 385/88 |
| 2005/0047730 A1* | 3/2005 | Ellison | G02B 6/4292 | 385/92 |
| 2005/0047733 A1* | 3/2005 | Hwang | G02B 6/4263 | 385/94 |
| 2005/0162758 A1* | 7/2005 | Tanaka | G02B 6/4206 | 359/811 |
| 2005/0185882 A1* | 8/2005 | Zack | G02B 6/4256 | 385/15 |
| 2005/0200979 A1* | 9/2005 | Nishihara | G02B 7/02 | 359/819 |
| 2006/0056781 A1* | 3/2006 | Okada | G02B 6/4292 | 385/94 |
| 2006/0093011 A1* | 5/2006 | Vancoille | G02B 6/4214 | 372/101 |
| 2006/0139774 A1* | 6/2006 | Pfnuer | G02B 7/022 | 359/819 |
| 2006/0263015 A1* | 11/2006 | Fincato | G02B 6/4201 | 385/92 |
| 2007/0242957 A1* | 10/2007 | Zhu | G02B 6/29362 | 398/182 |
| 2009/0074357 A1* | 3/2009 | Teo | G02B 6/4207 | 385/36 |
| 2009/0257717 A1* | 10/2009 | Liu | G02B 6/3887 | 65/412 |
| 2010/0172617 A1* | 7/2010 | Sato | G02B 6/421 | 385/88 |
| 2010/0316338 A1* | 12/2010 | Shono | G02B 6/4292 | 156/327 |
| 2011/0182082 A1* | 7/2011 | Ide | H01S 5/147 | 362/553 |
| 2013/0084045 A1* | 4/2013 | Aoki | G02B 6/3885 | 385/92 |
| 2016/0077302 A1* | 3/2016 | Amirkiai | B23K 11/08 | 219/121.64 |
| 2018/0113261 A1* | 4/2018 | Han | G02B 6/4292 | |
| 2019/0293882 A1* | 9/2019 | Hettler | G02B 6/4237 | |
| 2019/0361181 A1* | 11/2019 | Law | G02B 6/4271 | |
| 2020/0192038 A1* | 6/2020 | Noguchi | G02B 6/4248 | |
| 2020/0227908 A1* | 7/2020 | Iizuka | H02G 15/04 | |
| 2021/0033806 A1* | 2/2021 | Noguchi | G02B 6/4206 | |
| 2021/0132305 A1* | 5/2021 | Noguchi | G02B 6/4263 | |
| 2022/0373749 A1* | 11/2022 | Hiraka | G02B 6/4262 | |

* cited by examiner

OPTICAL RECEPTACLE AND OPTICAL MODULE

This application is entitled to the benefit of Japanese Patent Application No. 2021-086315, filed on May 21, 2021, the disclosure of which including the specification, drawings and abstract is incorporated herein by reference in its entirety.

TECHNICAL FIELD

The present invention relates to an optical receptacle and an optical module.

BACKGROUND ART

In the related art, an optical module including a light-emitting element such as a surface emitting laser (for example, vertical cavity surface emitting laser (VCSEL)), a light-receiving element such as a photodetector and the like is used for optical communications using optical transmission members such as optical fibers and light waveguides. The optical module includes one or more photoelectric conversion elements (light-emitting elements or light-receiving elements), and an optical receptacle for transmission, for reception or for transmission and reception.

PTL 1 discloses a resin lens structure (optical receptacle) including an objective surface (first optical surface) and an imaging surface (second optical surface). In the lens structure disclosed in PTL 1, a light source or a light detection device is fixed to the lens structure so as to face the objective surface, and an optical fiber is fixed to the lens structure so as to face the imaging surface. The lens structure disclosed in PTL 1 guides the light emitted from the light source to the end surface of the optical fiber, and guides the light emitted from the optical fiber to the light detection device.

CITATION LIST

Patent Literature

PTL 1
Japanese Patent Application Laid-Open No. 2006-163372

SUMMARY OF INVENTION

Technical Problem

As described above, the lens structure disclosed in PTL 1 is used in the field of optical communications. As such, the lens structure is expected to be used under a high temperature environment or under a low temperature environment. However, the lens structure disclosed in PTL 1 is made of resin, and consequently it expands under a high temperature environment while it contracts under a low temperature environment. As such, when the lens structure expands or contracts, the positional accuracy of the light source or the light detection device with respect to the lens structure may not be maintained, and optical communications may not be appropriately performed. Likewise, the positional accuracy of the optical fiber with respect to the lens structure may not be maintained, and optical communications may not be appropriately performed.

An object of the present invention is to provide an optical receptacle that can appropriately perform optical communications regardless of the change of the ambient temperature. In addition, another object of the present invention is to provide an optical module including the optical receptacle.

Solution to Problem

An optical receptacle according to an embodiment of the present invention is configured to optically couple a photoelectric conversion element and an optical transmission member when the optical receptacle is disposed between the optical transmission member and a photoelectric conversion element package including the photoelectric conversion element, the optical receptacle including: an optical receptacle main body; and a fixing member having a cylindrical shape and configured to fix the optical receptacle main body and the photoelectric conversion element package or the optical transmission member. The optical receptacle main body includes: a first optical surface configured to enter, into the optical receptacle main body, light emitted from the photoelectric conversion element package, or emit, toward the photoelectric conversion element package, light travelled inside the optical receptacle main body; a second optical surface configured to emit, toward the optical transmission member, light travelled inside the optical receptacle main body, or enter, into the optical receptacle main body, light emitted from the optical transmission member; and a groove having an annular shape, and disposed to surround a first central axis of the first optical surface, or disposed to surround a second central axis of the second optical surface. The fixing member is configured with a material with a smaller linear expansion coefficient than that of the optical receptacle main body, and is fit to the groove so as to be in contact with at least a part of an inner surface of the groove.

An optical module according to an embodiment of the present invention includes: a photoelectric conversion element package including a photoelectric conversion element; and the optical receptacle configured to optically couple the photoelectric conversion element and an optical transmission member.

Advantageous Effects of Invention

According to the present invention, optical communications can be appropriately performed even when the ambient temperature of the optical receptacle is changed.

DESCRIPTION OF EMBODIMENTS

An optical receptacle and an optical module according to an embodiment of the present invention are elaborated below with reference to the accompanying drawings.

Embodiment 1

Configuration of Optical Module

Figure 1:
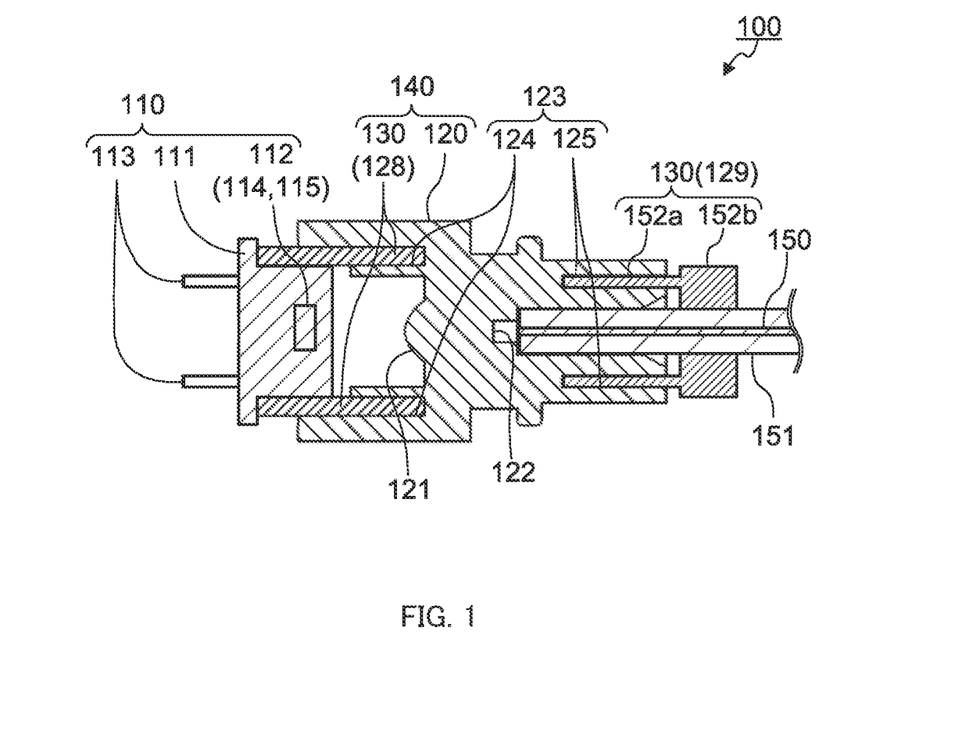
FIG. 1 is a sectional view of an optical module according to Embodiment 1 of the present invention in the state where an optical transmission member is fixed.

FIG. 1 is a sectional view of optical module 100 according to Embodiment 1 of the present invention in the state where optical transmission member 150 is fixed. Note that FIG. 1 also illustrates optical transmission member 150 and ferrule 151.

As illustrated in FIG. 1, optical module 100 includes photoelectric conversion element package 110, and optical receptacle 140 including optical receptacle main body 120 and fixing member 130. Optical module 100 is used with optical transmission member 150 connected to optical receptacle 140. Optical module 100 may be an optical module for transmission, or an optical module for reception. In the present embodiment, optical module 100 is an optical module for transmission, and optical receptacle 140 guides, to the end surface of optical transmission member 150, light emitted from photoelectric conversion element package 110. Note that in the case where optical module 100 is an optical module for reception, optical receptacle 140 guides, to photoelectric conversion element package 110, light emitted from the end surface of optical transmission member 150.

Photoelectric conversion element package 110 includes housing 111, photoelectric conversion element 112, and lead 113. Photoelectric conversion element 112 is disposed inside housing 111. Photoelectric conversion element package 110 is fixed to optical receptacle 140. In the present embodiment, photoelectric conversion element package 110 is fixed to optical receptacle main body 120 through fixing member 130.

Photoelectric conversion element 112 is light-emitting element 114 or light-receiving element 115, and is disposed inside housing 111. In the case where optical module 100 is an optical module for transmission, photoelectric conversion element 112 is light-emitting element 114. In addition, in the case where optical module 100 is an optical module for reception, photoelectric conversion element 112 is light-receiving element 115. In the present embodiment, optical module 100 is an optical module for transmission, and therefore photoelectric conversion element 112 is light-emitting element 114. Light-emitting element 114 is a vertical cavity surface emitting laser (VCSEL), for example. Light-receiving element 115 is a photodetector, for example.

One end portion of lead 113 is connected to photoelectric conversion element 112. Lead 113 is disposed to protrude from the bottom surface of housing 111. The number of leads 113 is not limited. In the present embodiment, three leads 113 are provided. In addition, in the present embodiment, three leads 113 are disposed at even intervals in the circumferential direction in bottom view of photoelectric conversion element package 110.

When disposed between photoelectric conversion element package 110 and optical transmission member 150, optical receptacle 140 optically couples photoelectric conversion element package 110 including light-emitting element 114 or light-receiving element 115 and the end surface of optical transmission member 150. In an optical module for transmission 100 as in the present embodiment, optical receptacle 140 allows incidence of light emitted from light-emitting element 114 serving as photoelectric conversion element 112, and emits the incident light toward the end surface of optical transmission member 150. Note that in an optical module for reception 100, optical receptacle 140 allows incidence of light emitted from the end surface of optical transmission member 150, and emits it toward the light-receiving surface of light-receiving element 115 serving as photoelectric conversion element 112.

The type of optical transmission member 150 is not limited. Examples of the type of optical transmission member 150 include optical fibers and light waveguides. In the present embodiment, optical transmission member 150 is connected to optical receptacle main body 120 through ferrule 151 and second fixing member 129. Ferrule 151 is a substantially cylindrical member disposed to surround optical transmission member 150. With optical transmission member 150 disposed inside ferrule 151, it is fixed to second fixing member 129 described later. In the present embodiment, optical transmission member 150 is an optical fiber. In addition, the optical fiber may be a single mode type, or a multiple mode type.

Configuration of Optical Receptacle

Figure 2A:
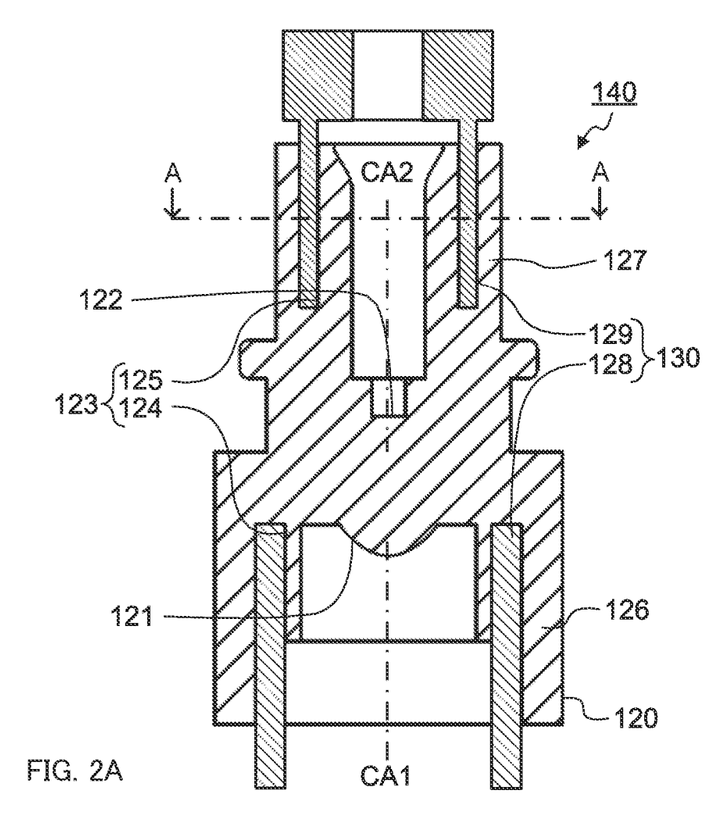
FIGS. 2A to 2C are diagrams illustrating a configuration of an optical receptacle according to Embodiment 1 of the present invention.
Figure 2B:
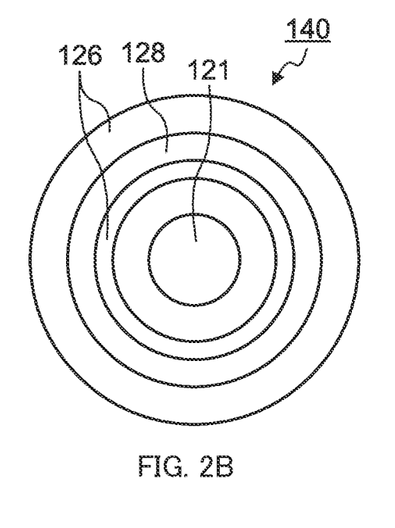
Figure 2C:
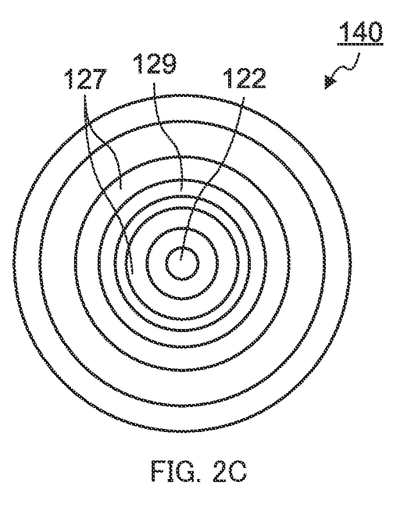

FIGS. 2A to 2C are diagrams illustrating a configuration of optical receptacle 140. FIG. 2A is a diagram illustrating optical receptacle 240 of Embodiment 1 in a cross section including first central axis CA1 and second central axis CA2, FIG. 2B is a bottom view, and FIG. 2C is a sectional view taken along line A-A of FIG. 2A.

As illustrated in FIGS. 2A to 2C, optical receptacle 140 includes optical receptacle main body 120 and fixing member 130. In the present embodiment, fixing member 130 includes first fixing member 128 and second fixing member 129.

Optical receptacle main body 120 is a substantially cylindrical optical member. In the present embodiment, photoelectric conversion element package 110 is fixed to one end of optical receptacle main body 120 through first fixing member 128, and optical transmission member 150 is fixed to the other end through second fixing member 129. Optical receptacle main body 120 includes first optical surface 121, second optical surface 122 and groove 123. In the present embodiment, groove 123 includes first groove 124 and second groove 125.

Optical receptacle main body 120 is formed with a material that is optically transparent to light of wavelengths used for optical communications. Examples of the material of optical receptacle 140 include polyetherimide (PEI) such as ULTEM (registered trademark) and transparent resin such as cyclic olefin resin. In addition, optical receptacle main body 120 may be integrally shaped and manufactured through injection molding, for example.

First optical surface 121 is an optical surface for entering, into optical receptacle main body 120, light emitted from photoelectric conversion element package 110 (light-emitting element 114), or emitting, toward photoelectric conversion element package 110 (light-receiving element 115), light entered from second optical surface 122 and travelled inside optical receptacle main body 120. The shape of first optical surface 121 is not limited. First optical surface 121 may be a convex lens surface protruding toward photoelectric conversion element package 110, a concave lens surface recessed to photoelectric conversion element package 110, or a flat surface. In the present embodiment, first optical surface 121 is a convex lens surface protruding toward photoelectric conversion element package 110. The shape in plan view of first optical surface 121 is not limited. The shape in plan view of first optical surface 121 may be a circular shape or an elliptical shape. In the present embodiment, the shape in plan view of first optical surface 121 is a circular shape.

First central axis CA1 of first optical surface 121 may be or may not be perpendicular to the surface of photoelectric conversion element 112 (the light-emitting surface of light-emitting element 114). In the present embodiment, first central axis CA1 is perpendicular to the surface of photoelectric conversion element 112 (the light-emitting surface of light-emitting element 114). In addition, preferably, first central axis CA1 of first optical surface 121 coincides with the center of the surface of photoelectric conversion element package 110 (the light-emitting surface of light-emitting element 114). First cylindrical part 126 with a shape disposed to surround first optical surface 121 (first central axis CA1) is disposed around first optical surface 121.

First cylindrical part 126 includes annular first groove 124. First groove 124 is disposed to surround first central axis CA1 of first optical surface 121. The shape in plan view of first groove 124 is not limited as long as it is disposed to surround first optical surface 121 and has a shape that is substantially complementary to first fixing member 128. In the present embodiment, the shape in plan view of first groove 124 is an annular shape. First fixing member 128 is fit to first groove 124.

First fixing member 128 is a cylindrical member with one end fixed to optical receptacle main body 120 and the other end fixed to photoelectric conversion element package 110. In the present embodiment, the cross-sectional shape of first fixing member 128 in the plane orthogonal to the axis direction of first fixing member 128 is a circular shape. That is, first fixing member 128 of the present embodiment has a cylindrical shape. The length in the axis direction of first fixing member 128 is not limited as long as the above-mentioned function can be ensured and photoelectric conversion element 122 can be disposed at an appropriate distance to first optical surface 121. In the present embodiment, the length in the axis direction of first fixing member 128 is greater than the depth of first groove 124. In this manner, one end of first fixing member 128 can be fixed to optical receptacle main body 120, and the other end can be fixed to photoelectric conversion element package 110. In addition, the distance between first optical surface 121 and photoelectric conversion element package 110 can be set to a desired length. Note that in the present embodiment, photoelectric conversion element package 110 is disposed in contact with the inside of first fixing member 128 at the other end of first fixing member 128.

First fixing member 128 is composed of a material with a smaller linear expansion coefficient than optical receptacle main body 120. The material of first fixing member 128 is not limited as long as the linear expansion coefficient is smaller than the material of optical receptacle main body 120. Preferably, the linear expansion coefficient of the material of first fixing member 128 is equal to or greater than $1\times10^{-6}$, and smaller than $10\times10^{-6}$. When the linear expansion coefficient of first fixing member 128 is equal to or greater than $1\times10^{-6}$, almost no deformation occurs even when the temperature changes under the use condition of optical module 100. Examples of the material of first fixing member 128 include metal, ceramics, and glass. Preferably, the material of first fixing member 128 is metal from a view point of the fixing method. In addition, the type of the metal used is also not limited. Examples of the type of the metal include stainless steel, iron, and aluminum.

First fixing member 128 is fit to first groove 124 so as to be in contact with at least a part of the inner surface of first groove 124. Optical receptacle main body 120 and first fixing member 128 may be assembled by pressing and fitting first fixing member 128 into first groove 124 of optical receptacle main body 120 after they are molded. In this case, when fitting first fixing member 128 and first groove 124, first groove 124 and first fixing member 128 are press-fit. In addition, optical receptacle main body 120 and first fixing member 128 may be assembled through insert molding. In addition, when fitting first fixing member 128 and photoelectric conversion element package 110, they are fixed with an adhesive agent, or fit by press-fitting photoelectric conversion element package 110 to first fixing member 128, or, fixed by welding photoelectric conversion element package 110 to first fixing member 128.

Second optical surface 122 is an optical surface for emitting, toward the end surface of optical transmission member 150, light entered from first optical surface 121 and travelled inside optical receptacle main body 120, or entering, into optical receptacle main body 120, light emitted from the end surface of optical transmission member 150. The shape of second optical surface 122 is not limited. Second optical surface 122 may be a convex lens surface protruding toward optical transmission member 150, a concave lens surface recessed to optical transmission member 150, or a flat surface. In the present embodiment, second optical surface 122 is a flat surface. The shape in plan view of second optical surface 122 is not limited. The shape in plan view of second optical surface 122 may be a circular shape or an elliptical shape. In the present embodiment, the shape in plan view of second optical surface 122 is a circular shape.

Second central axis CA2 of second optical surface 122 may be or may not be perpendicular to the end surface of optical transmission member 150. In the present embodiment, second central axis CA2 is perpendicular to the end surface of optical transmission member 150. Preferably, second central axis CA2 of second optical surface 122 coincides with the center of the end surface of optical transmission member 150. Cylindrical second cylindrical part 127 disposed to surround second optical surface 122 is disposed around second optical surface 122.

Second cylindrical part 127 includes annular second groove 125. Second groove 125 is disposed to surround second central axis CA2 of second optical surface 122. The shape in plan view of second groove 125 is not limited as long as it is disposed to surround second optical surface 122 and has a shape that is substantially complementary to main body fixing part 152*a* of second fixing member 129. In the present embodiment, the shape in plan view of second groove 125 is an annular shape. Second fixing member 129 is fit to second groove 125.

Second fixing member 129 is a cylindrical member with one end fixed to optical receptacle main body 120 and the other end fixed to optical transmission member 150 (ferrule 151). In the present embodiment, second fixing member 129 includes main body fixing part 152*a* and ferrule fixing part 152*b*. In the present embodiment, main body fixing part 152*a* and ferrule fixing part 152*b* are integrated with each other. The cross-sectional shape of main body fixing part 152*a* in the plane orthogonal to the axis direction of main body fixing part 152*a* is a circular shape. That is, main body fixing part 152*a* of the present embodiment has a cylindrical shape. Ferrule fixing part 152b has a thick cylindrical shape. Optical transmission member 150 supported by ferrule 151 is disposed inside the cylinder. The length in the axis direction of second fixing member 129 is not limited as long as the above-mentioned function can be ensured and optical transmission member 150 can be disposed with an appropriate distance with respect to second optical surface 122. In the present embodiment, the length in the axis direction of second fixing member 129 is greater than the depth of second groove 125. In this manner, one end of second fixing member 129 can be fixed to optical receptacle main body 120, and the other end can be fixed to optical transmission member 150 (ferrule 151). In addition, the distance between second optical surface 122 and the end surface of optical transmission member 150 can be set to a desired length.

Second fixing member 129 is composed of a material with a smaller linear expansion coefficient than optical receptacle main body 120. The material of second fixing member 129 may be the same material as first fixing member 128.

Second fixing member 129 is fit so as to be in contact with at least a part of the inner surface of second groove 125. Optical receptacle main body 120 and second fixing member 129 may be assembled such that second fixing member 129 is fit to second groove 125 of optical receptacle main body 120 after they are molded. In this case, when fitting second fixing member 129 and second groove 125, second groove 125 and second fixing member 129 are press-fit. In addition, optical receptacle main body 120 and second fixing member 129 may be assembled through insert molding. In addition, when fitting second fixing member 129 and ferrule 151, they are fixed with an adhesive agent, or fit by press-fitting ferrule 151 to ferrule fixing part 152b.

Figure 3A:
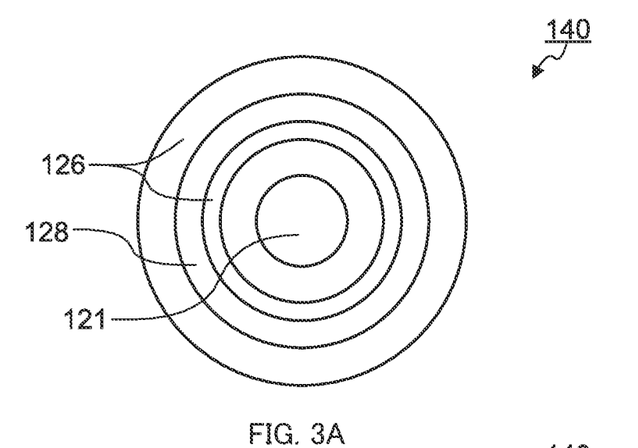
FIGS. 3A to 3C are schematic views for describing an influence of the temperature within a use range of the optical module.
Figure 3B:
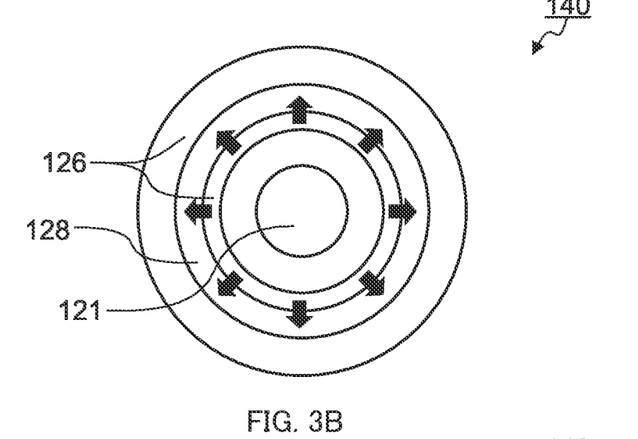
Figure 3C:
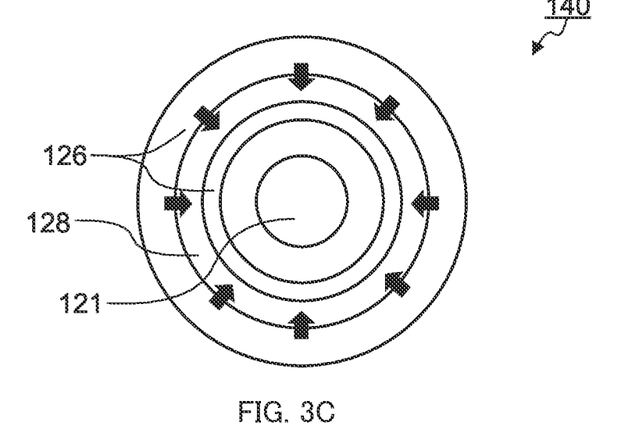

Now, an influence of the temperature under the use condition of optical module 100 is described. Note that the influence of the temperature on first cylindrical part 126 and first fixing member 128, and the influence of the temperature on second cylindrical part 127 and second fixing member 129 are substantially the same, and therefore the influence of the temperature on first cylindrical part 126 and first fixing member 128 is described below. FIG. 3A is a schematic view illustrating a stress that acts between first cylindrical part 126 and first fixing member 128 under a normal temperature environment, FIG. 3B is a schematic view illustrating a stress that acts between first cylindrical part 126 and first fixing member 128 under a high temperature environment, and FIG. 3C is a schematic view illustrating a stress that acts between first cylindrical part 126 and first fixing member 128 under a low temperature environment. FIGS. 3A to 3C are illustrated in the same direction as the bottom view of FIG. 2B.

As illustrated in FIG. 3A, no stress due to temperature change is generated between first cylindrical part 126 and first fixing member 128 in any direction under a normal temperature environment. Thus, the positions of first central axis CA1 of first optical surface 121 and the center of light-emitting element 114 are not displaced.

As illustrated in FIG. 3B, in optical module 100 under a high temperature environment, optical receptacle main body 120 is expanded to press first fixing member 128 radially outward. The reason for this is that by comparison between the linear expansion coefficient of the material of optical receptacle main body 120 and the linear expansion coefficient of the material of first fixing member 128, the linear expansion coefficient of the material of optical receptacle main body 120 is greater than the linear expansion coefficient of the material of first fixing member 128. At this time, optical receptacle main body 120 (first cylindrical part 126) evenly presses first fixing member 128 radially outward, and thus the positions of first central axis CA1 of first optical surface 121 and the center of light-emitting element 114 are not displaced. In addition, first fixing member 128 is not detached from optical receptacle main body 120.

As illustrated in FIG. 3C, in optical module 100 under a low temperature environment, optical receptacle main body 120 contracts so as to press first fixing member 128 radially inward. The reason for this is that by comparison between the linear expansion coefficient of the material of optical receptacle main body 120 and the linear expansion coefficient of the material of first fixing member 128, the linear expansion coefficient of the material of optical receptacle main body 120 is greater than the linear expansion coefficient of the material of first fixing member 128. At this time, optical receptacle main body 120 (first cylindrical part 126) evenly presses first fixing member 128 radially inward, and thus the positions of first central axis CA1 of first optical surface 121 and the center of light-emitting element 114 are not displaced. In addition, first fixing member 128 is not detached from optical receptacle main body 120.

Effects of the present invention are described below. Note that the relationship between first central axis CA1 of first optical surface 121 and the center of the light-emitting surface of light-emitting element 114 and the relationship between second central axis CA2 of second optical surface 122 and the center of the end surface of optical transmission member 150 are substantially the same, and therefore the relationship between first central axis CA1 of first optical surface 121 and the center of the light-emitting surface of light-emitting element 114 is described below as an example.

Figure 4A:
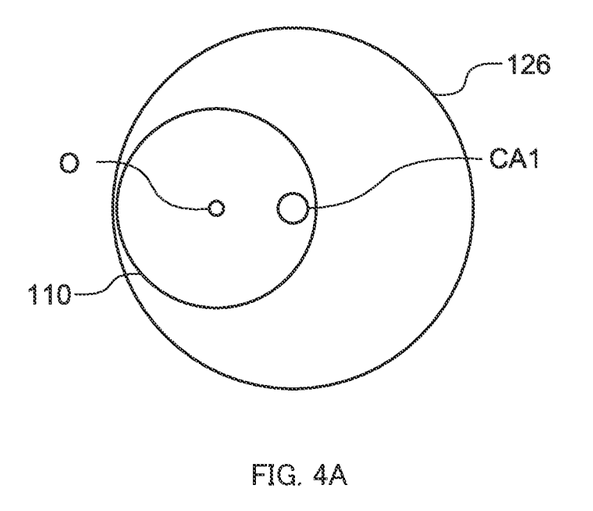
FIGS. 4A and 4B are diagrams for describing effects of an embodiment of the present invention.
Figure 4B:
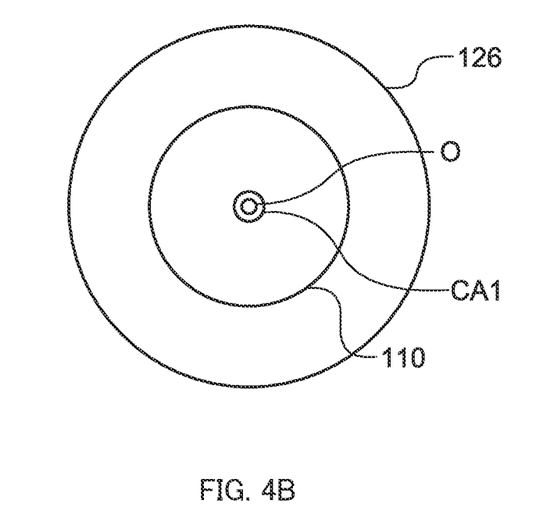

FIG. 4A is a schematic view for describing a case of a comparative example. FIG. 4B is a schematic view for describing effects of the present invention. These drawings illustrate an inner wall surface (the surface that makes contact with the outer peripheral surface of first fixing member 128) of a portion located outside first groove 124 in first cylindrical part 126, and an external wall surface (the surface that makes contact with the inner peripheral surface of first fixing member 128) of a portion that is fit to first fixing member 128 in photoelectric conversion element package 110. Here, the internal diameter of the above-mentioned portion of first cylindrical part 126 is 5.2 mm, and the outer diameter of the above-mentioned portion of photoelectric conversion element package 110 is 3.55 mm. The reference numeral O in these drawings indicates the center of the light-emitting surface of light-emitting element 114. In addition, optical transmission member 150 is a multiple mode optical fiber with a core diameter of 50 μm.

Note that in the optical module of the comparative example illustrated in FIG. 4A, photoelectric conversion element package 110 is fixed to the inside of first cylindrical part 126 by using an adhesive agent without using first fixing member 128. As described above, in optical module 100 of the present embodiment illustrated in FIG. 4B, photoelectric conversion element package 110 is fixed to the inside of first cylindrical part 126 by using first fixing member 128.

As illustrated in FIG. 4A, in the case of the optical module of the comparative example, optical receptacle main body 120 and the adhesive agent expand or contract under a high temperature environment or under a low temperature environment. In particular, since it is difficult to uniformly apply adhesive agent, it non-uniformly expands or contracts. As a result, the positions of the center of first cylindrical part 126 (first central axis CA1 of first optical surface 121) and center O of photoelectric conversion element package 110 (the center of light-emitting element 114) are displaced. At this time, for example, when the shift amount between the center of the inner wall surface of first cylindrical part 126 (first central axis CA1 of first optical surface 121) and center O of the light-emitting surface of light-emitting element 114 in photoelectric conversion element package 110 is 0.0017 mm, the light coupling efficiency can maintain the maximum value (88%). Note that the reason that the maximum value of the light coupling efficiency is 88% m, not 100%, is that the reflection at each boundary surface is taken into consideration. The light coupling efficiency is reduced to 38% when the shift amount is 0.017 mm, and the light coupling efficiency becomes 0% when the shift amount is 0.845 mm That is, the light emitted from light-emitting element 114 does not enter the end surface of optical transmission member 150.

On the other hand, as illustrated in FIG. 4B, in the case of optical module 100 of the present embodiment, optical receptacle main body 120 expands or contracts under a high temperature environment or under a low temperature environment, but the center of first cylindrical part 126 (first central axis CA1 of first optical surface 121) and the center of photoelectric conversion element package 110 (the center of light-emitting element 114) coincide with each other without change. The reason for this is that the stress evenly acts on first fixing member 128 such that the positions of the center of first cylindrical part 126 and first central axis CA1 of first optical surface 121 are not displaced. At this time, the center of the inner wall surface of first cylindrical part 126 and center O of photoelectric conversion element package 110 coincide with each other, and thus the light coupling efficiency is the maximum value (88%).

Effects

In this manner, in optical module 100 according to the present embodiment, fixing member 130 is composed of a material with a smaller linear expansion coefficient than optical receptacle main body 120, and the stress acts on fixing member 130 in a point symmetrical manner in a high temperature environment or a low temperature environment, and thus, the positional accuracies of first central axis CA1 of first optical surface 121 and the center of the light-emitting surface of light-emitting element 114, and second central axis CA2 of second optical surface 122 and the center of the end surface of optical transmission member 150 are maintained. In this manner, optical communications can be appropriately performed regardless of the change of the ambient temperature of optical module 100.

Embodiment 2

Next, an optical module of Embodiment 2 is described. In the optical module of the present embodiment, the shape of groove 223 in optical receptacle 240 is different from that of optical module 100 according to Embodiment 1. In view of this, here, the configuration of optical receptacle 240 is mainly described.

Configuration of Optical Receptacle

Figure 5A:
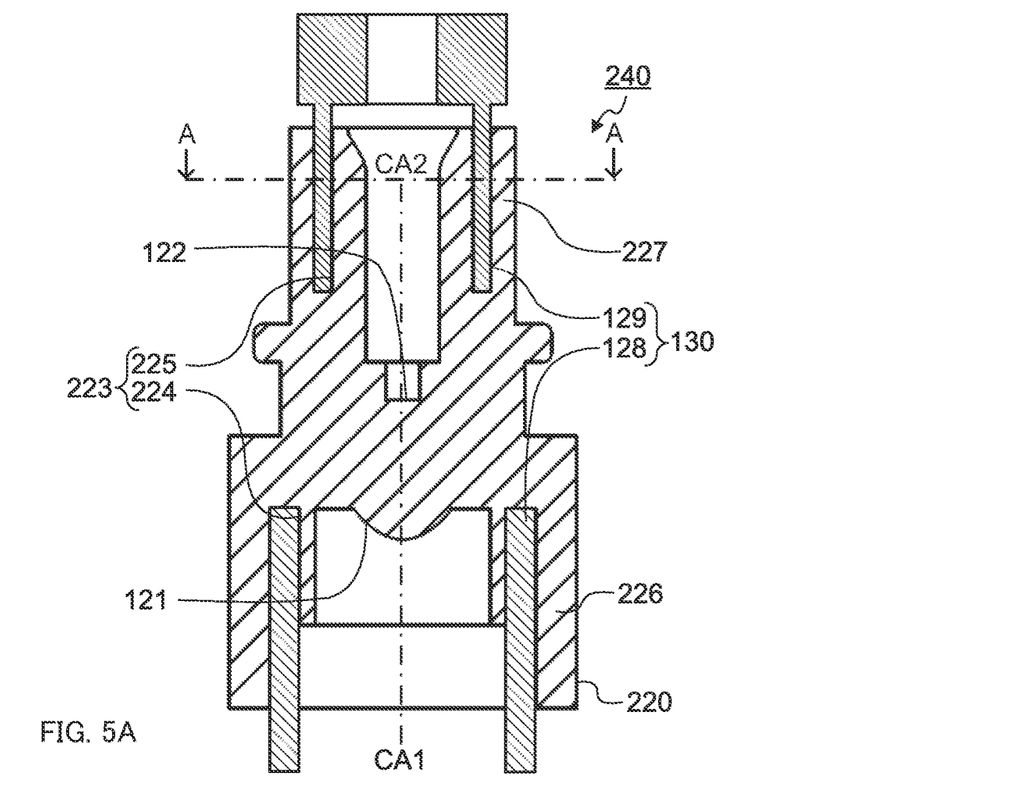
FIGS. 5A to 5C are diagrams illustrating a configuration of an optical receptacle according to Embodiment 2 of the present invention.
Figure 5B:
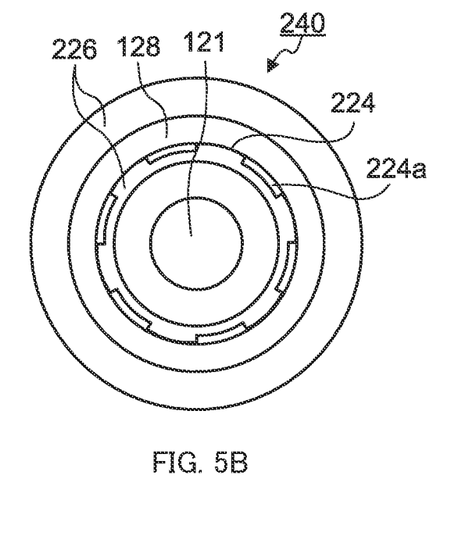
Figure 5C:
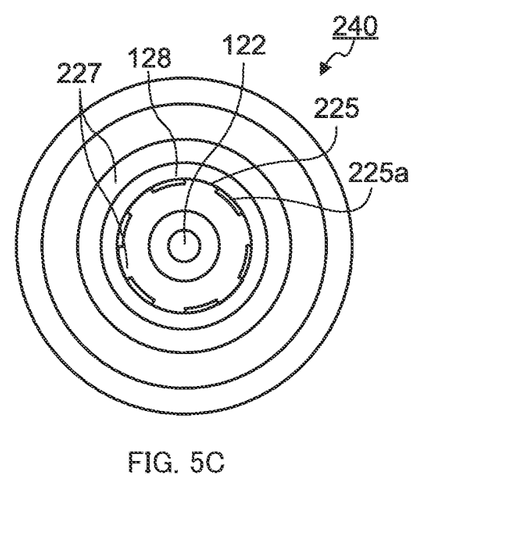

FIGS. 5A to 5C illustrate a configuration of optical receptacle 240 according to Embodiment 2. FIG. 5A is a diagram illustrating optical receptacle 240 of Embodiment 2 in a cross section including first central axis CA1 and second central axis CA2, FIG. 5B is a bottom view, and FIG. 5C is a sectional view taken along line A-A of FIG. 5A.

As illustrated in FIGS. 5A to 5C, optical receptacle 240 includes optical receptacle main body 220 and fixing member 130. Optical receptacle main body 220 includes first optical surface 121, second optical surface 122 and groove 223. Groove 223 includes first groove 224 disposed at first cylindrical part 226, and second groove 225 disposed at second cylindrical part 227.

First groove 224 is disposed to surround first central axis CA1 of first optical surface 121. In the present embodiment, the shape in plan view of first groove 224 is a substantially circular shape. First valley 224a or a ridge is disposed at the inner surface of first groove 224 on the first central axis CA1 side.

First valley 224a is disposed in the direction along first central axis CA1. Number of first valleys 224a is not limited as long as the contact area between the inner wall surface of first groove 224 and first fixing member 128 can be reduced under a normal temperature environment at the time of assembling the optical module. In the present embodiment, six first valleys 224a are provided. Preferably, the plurality of first valleys 224a is disposed at even intervals in the circumferential direction. With the plurality of first valleys 224a disposed at even intervals in the circumferential direction, the positional accuracy of first central axis CA1 and the center of the light-emitting surface of light-emitting element 114 can be maintained.

Preferably, the depth of first valley 224a is set to a value with which the bottom portion of first valley 224a makes contact with first fixing member 128 when the optical module is disposed under a high temperature environment and first cylindrical part 226 is expanded. In this manner, under the high temperature environment, the stress acts on first fixing member 128 from the entire surface of the inner surface of first groove 224 on central axis CA1 side, and thus the positional accuracy of first central axis CA1 and the center of the light-emitting surface can be maintained as in Embodiment 1. When fitting first fixing member 128 to first groove 224 of the present embodiment, first fixing member 128 does not make contact with first cylindrical part 226 at the portion of first valley 224a, and thus the friction between first groove 224 and first fixing member 128 is reduced. This makes the assembling easier.

Second groove 225 is disposed to surround second central axis CA2 of second optical surface 122, and is open at the top surface of second cylindrical part 227 facing optical transmission member 150. In the present embodiment, the shape in plan view of second groove 225 is an annular shape. A plurality of second valleys 225a is disposed at the inner surface of second groove 225 on first central axis CA1 side. The shape of second valley 225a is the same as first valley 224a disposed at first groove 224, and therefore the description thereof will be omitted. When fitting second fixing member 129 to second groove 225 of the present embodiment, second fixing member 129 does not make contact with second valley 225a, and thus the friction between second groove 225 and second fixing member 129 is reduced. This makes the assembling easier.

Effects

In this manner, the optical module according to the present embodiment can be easily assembled while achieving the same effects as those of optical module 100 according to Embodiment 1.

Modification 1 and Modification 2

Next, optical modules according to Modification 1 and Modification 2 of the embodiment are described. Modification 1 and Modification 2 of the embodiment are different from optical module 100 according to Embodiment 1 only in the arrangements of grooves 323 and 423. In view of this, here, only the arrangements of grooves 323 and 423 are described.

Figure 6A:
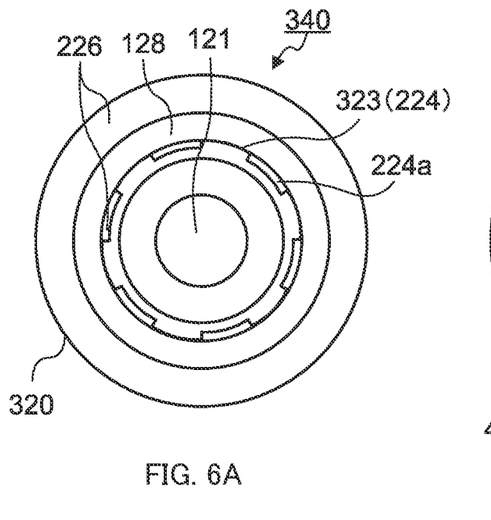
FIGS. 6A to 6D are diagrams illustrating configurations of optical receptacles according to Modification 1 and Modification 2 of Embodiment 2.
Figure 6B:
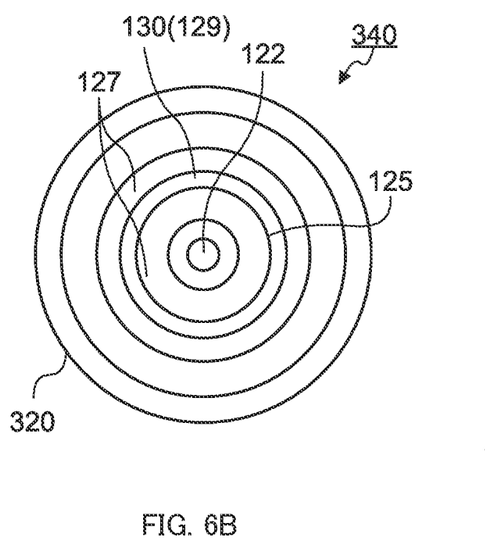
Figure 6C:
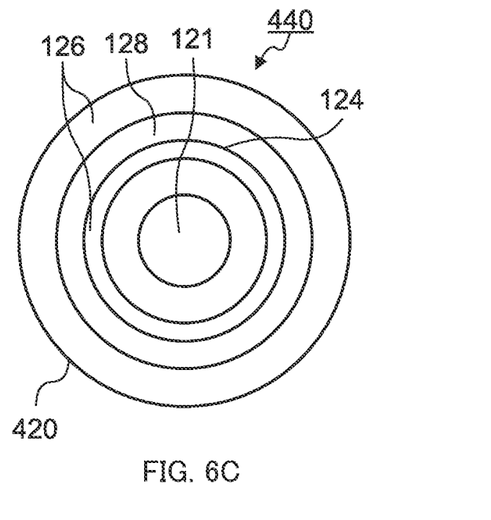
Figure 6D:
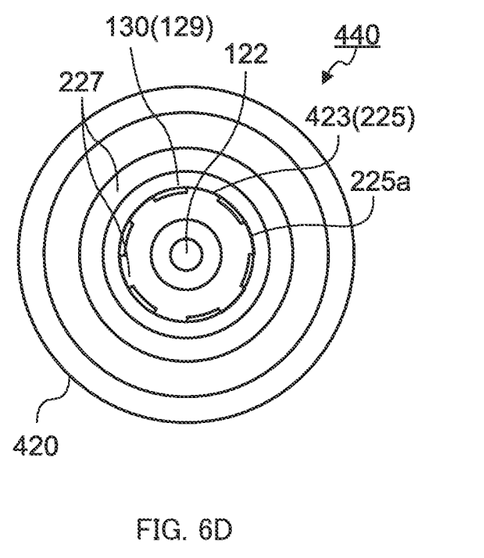

FIG. 6A is a bottom view of optical receptacle 340 in an optical module according to Modification 1 of the present embodiment, and FIG. 6B is a sectional view in a direction orthogonal to first central axis CA1 and second central axis CA2. FIG. 6C is a bottom view of optical receptacle 440 in an optical module according to Modification 2 of the present embodiment, and FIG. 6D is a sectional view in a direction orthogonal to first central axis CA1 and second central axis CA2. FIGS. 6B and 6D are sectional views corresponding to FIG. 5C.

As illustrated in FIGS. 6A and 6B, optical receptacle 340 in the optical module according to the modification of the present embodiment includes optical receptacle main body 320 and fixing member 130. Optical receptacle main body 320 includes first optical surface 121, second optical surface 122 and groove 323. Groove 323 includes first groove 224 and second groove 125. That is, in the present modification, first groove 224 is the same as first groove 224 in Embodiment 2, and second groove 125 is the same as second groove 125 in Embodiment 1.

As illustrated in FIGS. 6C and 6D, optical receptacle 440 in the optical module according to the modification of the present embodiment includes optical receptacle main body 420 and fixing member 130. Optical receptacle main body 420 includes first optical surface 121, second optical surface 122 and groove 423. Groove 423 includes first groove 124 and second groove 225. That is, in the present modification, first groove 124 is the same as first groove 124 in Embodiment 1, and second groove 225 is the same as second groove 225 in Embodiment 2.

Note that in this modification, valleys 224a and 225a are disposed at the inner surface inside first groove 224 or the inner surface inside second groove 225 as an example, but valleys 224a and 225a may be disposed at the inner surface outside first groove 224 or the inner surface outside second groove 225.

Effects

In this manner, the optical module according to the present modification has the same effects as those of the optical module according to Embodiment 2.

Embodiment 3

Next, an optical module according to Embodiment 3 is described. The optical module according to the present embodiment is different from optical module 100 according to Embodiment 1 in the shape of groove 523 and the shape of fixing member 530. In view of this, here, the shape of mainly groove 523 and the shape of fixing member 530 are mainly described.

Configuration of Optical Receptacle

Figure 7:
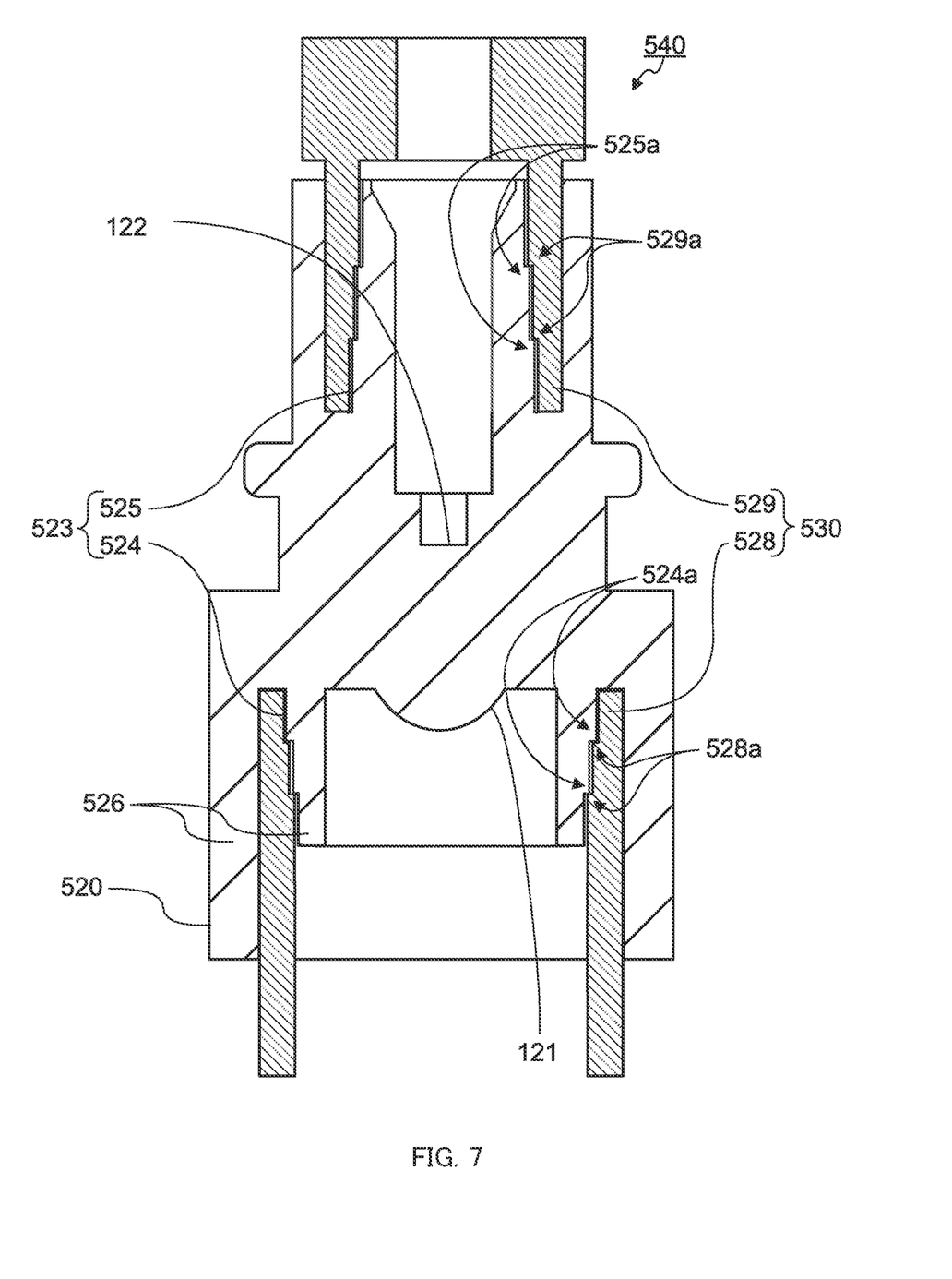
FIG. 7 is a sectional view of an optical receptacle according to Embodiment 3 of the present invention.
Figure 8A:
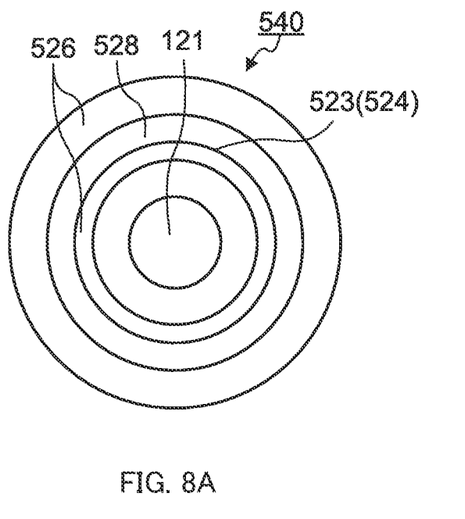
FIGS. 8A and 8B are diagrams illustrating a configuration of an optical receptacle according to Embodiment 3.

FIG. 7 is a diagram illustrating optical receptacle 540 according to Embodiment 3 in a cross section including first central axis CA1 and second central axis CA2. FIG. 8A is a bottom view of optical receptacle 540, and FIG. 8B is a sectional view in a direction orthogonal to first central axis CA1 and second central axis CA2.

Figure 8B:
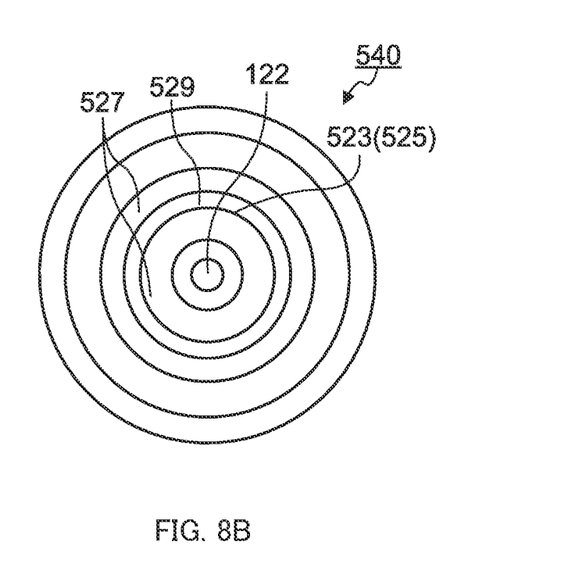

As illustrated in FIGS. 7, 8A and 8B, optical receptacle 540 includes optical receptacle main body 520 and fixing member 530. Optical receptacle main body 520 includes first optical surface 121, second optical surface 122 and groove 523. Groove 523 includes first groove 524 and second groove 525. Fixing member 530 includes first fixing member 528 and second fixing member 529.

First groove 524 is disposed at first cylindrical part 526 to surround first central axis CA1 of first optical surface 121. In the present embodiment, the shape in plan view of first groove 524 is an annular shape. The inner surface of first groove 524 on first central axis CA1 side is disposed such that it goes away from first fixing member 528 in the direction from the bottom portion toward the opening.

In the present embodiment, groove side step 524a is disposed at the inner surface of first groove 524 on first central axis CA1 side. The number of groove side steps 524a is not limited. One groove side step 524a, or a plurality of groove side steps 524a may be provided. In the present embodiment, two groove side steps 524a are provided.

The depths of groove side steps 524a may or may not be identical to each other. Preferably, the depth of groove side step 524a is a value with which groove side step 524a makes contact with first fixing member 528 when the optical module is disposed under a high temperature environment and optical receptacle main body 120 is expanded. In this manner, the stress acts on first fixing member 128 from the entire inner surface of first groove 524 under a high temperature environment, and thus the positional accuracy of first central axis CA1 and the center of the light-emitting surface of light-emitting element 114 can be maintained as in Embodiment 1. When optical receptacle 540 including groove side step 524a is disposed under a high temperature environment, such as an environment of 45° C. to 65° C., groove side step 524a on the bottom side of first groove 524 presses first fixing member 528 radially outward. Further, when it is disposed under an environment of 65 to 85° C., opening side groove side step 524a, as well as bottom side groove side step 524a, presses first fixing member 128 radially outward, for example.

In first fixing member 528, fixing member side step 528a is disposed at the surface facing groove side step 524a of first groove 524. The number of fixing member side steps 528a is the same as the number of groove side steps. In the present embodiment, two fixing member side steps 528a are provided. Two fixing member side steps have shapes that are substantially complementary to two groove side steps 524a.

The distance between groove side step 524a of first groove 524 on the bottom side and fixing member side step 528a of first fixing member 528 on the end side and the distance between groove side step 524a of first groove 524 on the opening side and step 528a of first fixing member 528 on the other fixing member side may be identical to each other or different from each other. In the present embodiment, the distance on the bottom side of first groove 524 is smaller than the distance on opening side of first groove 524.

Second groove 525 is disposed to surround second central axis CA2 of second optical surface 122 and opens at the top surface of second cylindrical part 527 facing optical transmission member 150. In the present embodiment, the shape in plan view of second groove 525 is a substantially annular shape. The inner surface of second groove 525 on second central axis CA2 side is disposed such that it goes away from second fixing member 529 in the direction from the bottom portion toward the opening. The structure of second groove 525 is the same as the structure of first groove 524, and therefore the description thereof will be omitted. That is, in the present embodiment, second groove 525 includes two groove side steps 525a.

In second fixing member 529, fixing member side step 529a is disposed at the surface facing groove side step 525a of second groove 525. The number of fixing member side steps 529a is the same as the number of groove side steps 525a. In the present embodiment, two fixing member side steps 529a have shapes that are complementary to groove side steps 525a.

Effects

In this manner, the optical module according to the present embodiment has the same effects as those of the optical module according to Embodiment 2.

Modification 1 and Modification 2

Next, optical modules according to Modification 1 and Modification 2 of the embodiment are described. Modification 1 and Modification 2 of the embodiment are different from the optical module according to Embodiment 1 only in configurations of grooves 623 and 723 and configurations of fixing members 630 and 730. In view of this, the configurations of grooves 623 and 723 and the configurations of fixing members 630 and 730 are mainly described below.

Figure 9A:
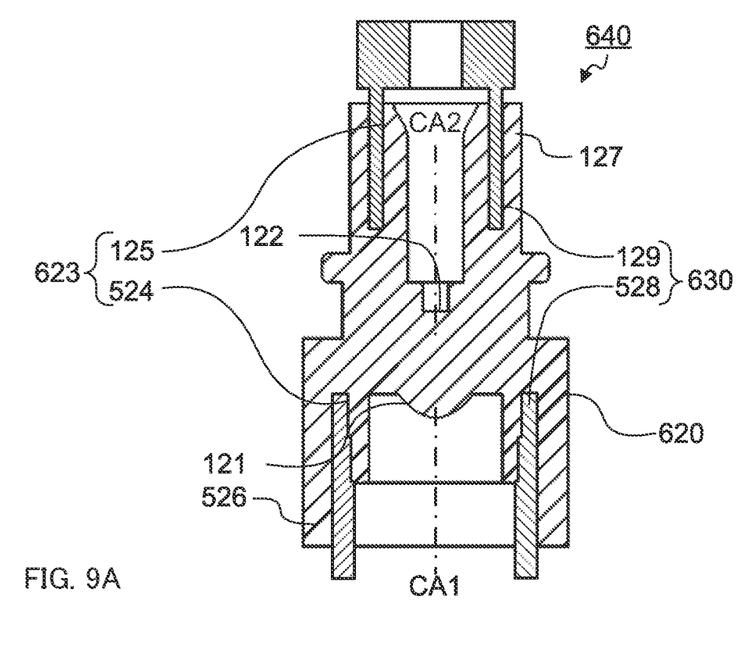
FIGS. 9A and 9B are diagrams illustrating configurations of optical receptacles according to Modification 1 and Modification 2 of Embodiment 3.
Figure 9B:
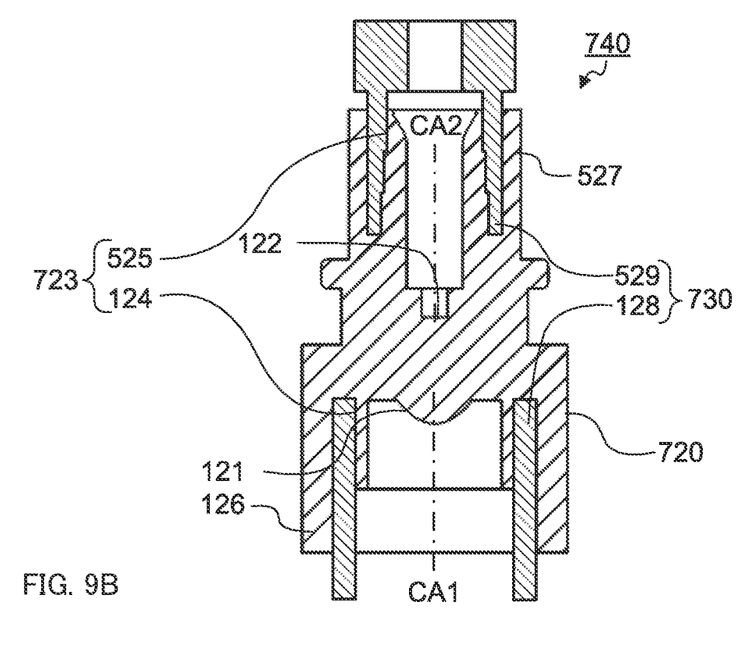

FIG. 9A is a sectional view of optical receptacle 640 according to Modification 1 of the present embodiment, and FIG. 9B is a sectional view of optical receptacle 740 according to Modification 2.

As illustrated in FIG. 9A, optical receptacle 640 in the optical module according to Modification 1 of the present embodiment includes optical receptacle main body 620 and fixing member 630. Optical receptacle main body 620 includes first optical surface 121, second optical surface 122 and groove 623. Groove 623 includes first groove 524 and second groove 125. That is, in the present modification, first groove 524 and first fixing member 528 are the same as first groove 524 and first fixing member 528 in Embodiment 3, and second groove 125 and second fixing member 129 are the same as second groove 125 and second fixing member 129 in Embodiment 1.

As illustrated in FIG. 9B, optical receptacle 740 in the optical module according to the modification of the present embodiment includes optical receptacle main body 720 and fixing member 730. Optical receptacle main body 720 includes first optical surface 121, second optical surface 122 and groove 723. Groove 723 includes first groove 124 and second groove 525. That is, in the present modification, first groove 124 and first fixing member 128 are the same as first groove 124 and first fixing member 128 in Embodiment 1, and second groove 525 and second fixing member 529 are the same as second groove 525 and second fixing member 529 in Embodiment 3.

In this manner, the optical module according to the present embodiment has the same effects as those of the optical module according to Embodiment 2.

Note that the optical receptacle may include any one of first fixing members 128 and 528 and second fixing members 129 and 529. Even when the optical receptacle includes only one of first fixing members 128 and 528 or second fixing members 129 and 529, the deformation due to the use temperature of the optical receptacle can be suppressed. In this manner, the positional displacement of the center of the light-emitting surface of light-emitting element 114 and optical transmission member 150 can be suppressed.

INDUSTRIAL APPLICABILITY

The optical receptacle and the optical module according to the embodiment of the present invention are suitable for optical communications using optical transmission members.

REFERENCE SIGNS LIST

100 Optical module
110 Photoelectric conversion element package
111 Housing
112 Photoelectric conversion element
113 Lead
114 Light-emitting element
115 Light-receiving element
120, 220, 320, 420, 520, 620, 720 Optical receptacle main body
121 First optical surface
122 Second optical surface
123, 223, 323, 423, 523, 623, 723 Groove
124, 224, 524 First groove
125, 225, 525 Second groove
126, 226, 526 First cylindrical part
127, 227, 527 Second cylindrical part
128, 528 First fixing member
129, 529 Second fixing member
130, 530, 630, 730 Fixing member
140, 240, 340, 440, 540, 640, 740 Optical receptacle
150 Optical transmission member
151 Ferrule
152a Main body fixing part
152b Ferrule fixing part
224a First valley
225a Second valley
524a, 525a Groove side step
528a, 529a Fixing member side step
CA1 First central axis
CA2 Second central axis

What is claimed is:

1. An optical receptacle configured to optically couple a photoelectric conversion element and an optical transmission member when the optical receptacle is disposed between the optical transmission member and a photoelectric conversion element package including the photoelectric conversion element, the optical receptacle comprising:
    an optical receptacle main body; and
    a fixing member having a cylindrical shape and configured to fix the optical receptacle main body and the photoelectric conversion element package or the optical transmission member,
    wherein the optical receptacle main body includes:
        a first optical surface configured to enter, into the optical receptacle main body, light emitted from the photoelectric conversion element package, or emit, toward the photoelectric conversion element package, light travelled inside the optical receptacle main body;
        a second optical surface configured to emit, toward the optical transmission member, light travelled inside the optical receptacle main body, or enter, into the optical receptacle main body, light emitted from the optical transmission member; and
        a groove having an annular shape, and disposed to surround a first central axis of the first optical surface, or disposed to surround a second central axis of the second optical surface; and
    wherein the fixing member is configured with a material with a smaller linear expansion coefficient than that of the optical receptacle main body, and is fit to the groove so as to be in contact with at least a part of an inner surface of the groove.

2. The optical receptacle according to claim 1, wherein the fixing member is configured with metal.

3. The optical receptacle according to claim 1,
    wherein the groove includes:
        a first groove disposed to surround the first central axis of the first optical surface; and
        a second groove disposed to surround the second central axis of the second optical surface, and wherein the fixing member includes:
- a first fixing member fit to the first groove and configured to fix the optical receptacle main body and the photoelectric conversion element package; and
- a second fixing member fit to the second groove and configured to fix the optical receptacle main body and the optical transmission member.

4. The optical receptacle according to claim 1, wherein a valley or a ridge disposed along the first central axis or the second central axis is disposed in the inner surface of the groove.

5. The optical receptacle according to claim 1, wherein the inner surface of the groove is disposed such that the inner surface goes away from the fixing member in a direction from a bottom portion toward an opening of the groove.

6. An optical module, comprising:
- a photoelectric conversion element package including a photoelectric conversion element; and
- the optical receptacle according to claim 1 configured to optically couple the photoelectric conversion element and an optical transmission member.

* * * * *